US009474008B2

(12) United States Patent
Byun et al.

(10) Patent No.: US 9,474,008 B2
(45) Date of Patent: Oct. 18, 2016

(54) METHOD AND APPARATUS FOR INDICATING HANDOVER IN WIRELESS COMMUNICATION SYSTEM INCLUDING MOBILE RELAY NODE

(71) Applicant: LG ELECTRONICS INC., Seoul (KR)

(72) Inventors: Dae Wook Byun, Anyang-si (KR); Kyung Min Park, Anyang-si (KR); Jin Sook Ryu, Anyang-si (KR); Jian Xu, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/362,793

(22) PCT Filed: Jan. 4, 2013

(86) PCT No.: PCT/KR2013/000046
§ 371 (c)(1),
(2) Date: Jun. 4, 2014

(87) PCT Pub. No.: WO2013/109008
PCT Pub. Date: Jul. 25, 2013

(65) Prior Publication Data
US 2014/0370900 A1 Dec. 18, 2014

Related U.S. Application Data

(60) Provisional application No. 61/588,605, filed on Jan. 19, 2012.

(51) Int. Cl.
*H04W 36/00* (2009.01)
*H04W 36/34* (2009.01)
(Continued)

(52) U.S. Cl.
CPC ......... *H04W 36/34* (2013.01); *H04W 36/0055* (2013.01); *H04B 7/15* (2013.01); *H04W 36/08* (2013.01); *H04W 84/005* (2013.01); *H04W 84/047* (2013.01)

(58) Field of Classification Search
CPC . H04W 8/26; H04W 36/0088; H04W 48/04; H04W 48/08; H04W 84/005; H04W 84/045; H04W 84/047; H04W 84/18; H04W 36/0005; H04W 36/0083; H04W 36/0061; H04W 36/0066; H04W 36/0016
USPC ............. 455/436, 437, 438, 439, 442, 552.1
See application file for complete search history.

(56) References Cited

U.S. PATENT DOCUMENTS 9,155,012 B2 * 10/2015 Redana ................. H04W 36/22
2008/0285500 A1 * 11/2008 Zhang et al. ................. 370/315
(Continued)

FOREIGN PATENT DOCUMENTS

KR 10-2011-0124710 A 11/2011

OTHER PUBLICATIONS

"3GPP TR 36.806 V2.0.0: 3rd Generation Partnership Project; Technical Specification Group Radio Access Network; Evolved Universal Terrestrial Radio Access (E-UTRA); Relay architectures for E-UTRA (LTE-Advanced) (Release 9)", Feb. 2010, See section 4.2.4 Signalling procedures.

(Continued)

*Primary Examiner* — Jean Gelin
(74) *Attorney, Agent, or Firm* — Birch, Stewart, Kolasch & Birch, LLP

(57) ABSTRACT

A method and apparatus for indicating a handover in a wireless communication system is provided. A mobile relay node (RN) receives an indication which indicates that there is no eNB supporting relay within neighbor cells from a donor eNodeB (eNB) serving the mobile relay node, and transmits a handover command message to user equipments (UEs).

3 Claims, 15 Drawing Sheets

(51) Int. Cl.

| | |
|---|---|
| *H04W 36/08* | (2009.01) |
| *H04W 84/00* | (2009.01) |
| *H04W 84/04* | (2009.01) |
| *H04B 7/15* | (2006.01) |

(56) References Cited

U.S. PATENT DOCUMENTS

| | | | |
|---|---|---|---|
| 2010/0260096 A1* | 10/2010 | Ulupinar et al. | 370/315 |
| 2011/0249613 A1* | 10/2011 | Sun et al. | 370/315 |
| 2011/0268062 A1* | 11/2011 | Ji | H04J 11/005 370/329 |
| 2011/0305213 A1* | 12/2011 | Lohr et al. | 370/329 |
| 2012/0071085 A1* | 3/2012 | Gunnarsson et al. | 455/7 |
| 2012/0300693 A1* | 11/2012 | Takahashi et al. | 370/315 |
| 2012/0320817 A1* | 12/2012 | Xu | H04W 8/08 370/315 |
| 2013/0059589 A1* | 3/2013 | Dalsgaard | H04W 36/32 455/437 |
| 2013/0163504 A1* | 6/2013 | Jia et al. | 370/315 |
| 2013/0273926 A1* | 10/2013 | Peng et al. | 455/450 |
| 2013/0337813 A1* | 12/2013 | Van Phan et al. | 455/436 |
| 2014/0003327 A1* | 1/2014 | Seo | H04W 36/08 370/315 |
| 2014/0086138 A1* | 3/2014 | Teyeb | H04B 7/2606 370/315 |
| 2014/0206354 A1* | 7/2014 | Yasuoka | H04B 7/15 455/436 |
| 2015/0024757 A1* | 1/2015 | Bulakci et al. | 455/437 |

OTHER PUBLICATIONS

Shooshtari, "Optimizing handover performance in LTE networks containing relays", Aalto University, Apr. 29, 2011, See section 4. Relays and 5. Problem formulation.

* cited by examiner

Fig. 3
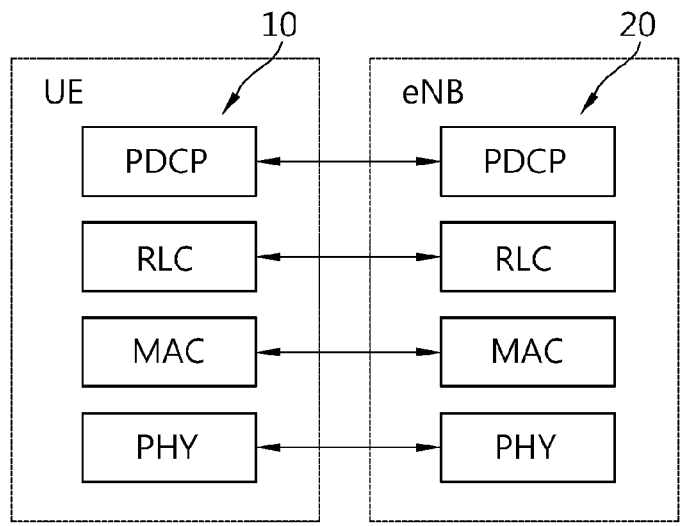
(a)
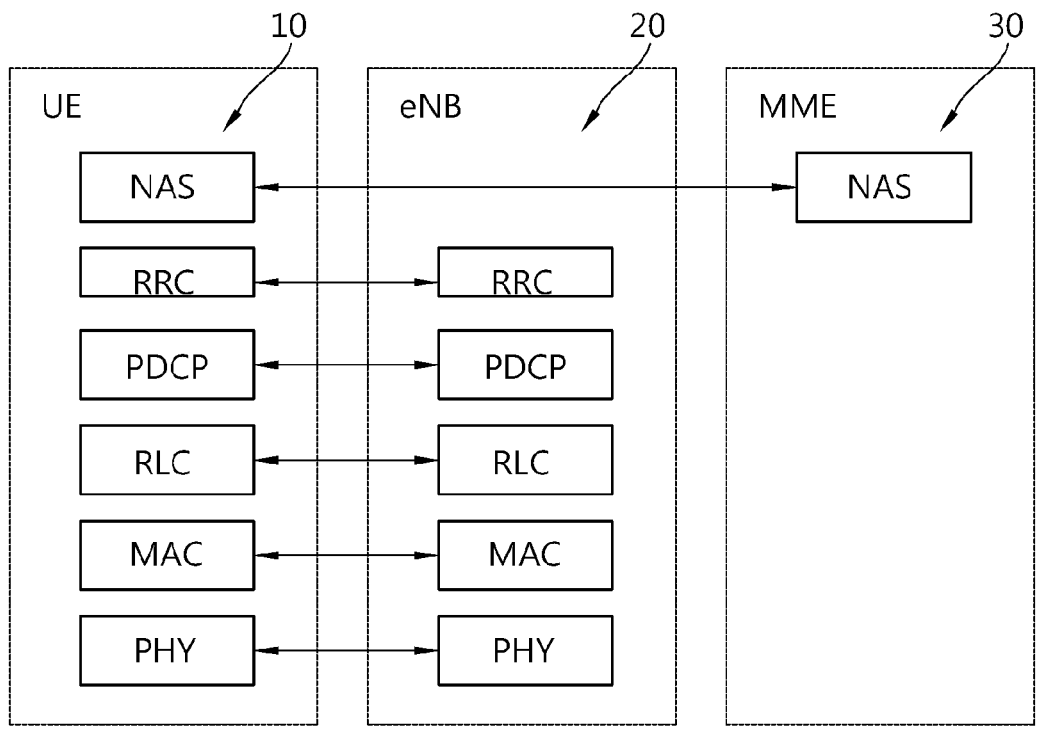
(b)

METHOD AND APPARATUS FOR INDICATING HANDOVER IN WIRELESS COMMUNICATION SYSTEM INCLUDING MOBILE RELAY NODE

CROSS REFERENCE TO RELATED APPLICATIONS

This application is the National Phase of PCT/KR2013/000046 filed on Jan. 4, 2013, which claims priority under 35 U.S.C. 119(e) to U.S. Provisional Application No. 61/588,605 filed on Jan. 19, 2012, all of which are hereby expressly incorporated by reference into the present application.

TECHNICAL FIELD

The present invention relates to wireless communication, and more particularly, to a method and apparatus for indicating a handover in a wireless communication system including a mobile relay node.

BACKGROUND ART

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

FIG. 1 shows network structure of an evolved universal mobile telecommunication system (E-UMTS). The E-UMTS may be also referred to as an LTE system. The communication network is widely deployed to provide a variety of communication services such as voice over internet protocol (VoIP) through IMS and packet data.

As illustrated in FIG. 1, the E-UMTS network includes an evolved UMTS terrestrial radio access network (E-UTRAN), an evolved packet core (EPC) and one or more user equipment. The E-UTRAN may include one or more evolved NodeB (eNB) 20, and a plurality of user equipment (UE) 10. One or more E-UTRAN mobility management entity (MME)/system architecture evolution (SAE) gateways (S-GW) 30 may be positioned at the end of the network and connected to an external network.

As used herein, "downlink" refers to communication from eNB 20 to UE 10, and "uplink" refers to communication from the UE to an eNB. UE 10 refers to communication equipment carried by a user and may be also referred to as a mobile station (MS), a user terminal (UT), a subscriber station (SS) or a wireless device.

An eNB 20 provides end points of a user plane and a control plane to the UE 10. MME/S-GW 30 provides an end point of a session and mobility management function for UE 10. The eNB and MME/S-GW may be connected via an S1 interface.

The eNB 20 is generally a fixed station that communicates with a UE 10, and may also be referred to as a base station (BS) or an access point. One eNB 20 may be deployed per cell. An interface for transmitting user traffic or control traffic may be used between eNBs 20.

The MME provides various functions including non-access stratum (NAS) signaling to eNBs 20, NAS signaling security, access stratum (AS) security control, Inter core network (CN) node signaling for mobility between 3GPP access networks, Idle mode UE reachability (including control and execution of paging retransmission), tracking area list management (for UE in idle and active mode), packet data network (PDN) GW and serving GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g. deep packet inspection), lawful interception, UE internet protocol (IP) address allocation, transport level packet marking in the downlink, UL and DL service level charging, gating and rate enforcement, DL rate enforcement based on APN-AMBR. For clarity MME/S-GW 30 will be referred to herein simply as a "gateway," but it is understood that this entity includes both an MME and an SAE gateway.

A plurality of nodes may be connected between eNB 20 and gateway 30 via the S1 interface. The eNBs 20 may be connected to each other via an X2 interface and neighboring eNBs may have a meshed network structure that has the X2 interface.

FIG. 2 shows architecture of a typical E-UTRAN and a typical EPC.

As illustrated, eNB 20 may perform functions of selection for gateway 30, routing toward the gateway during a radio resource control (RRC) activation, scheduling and transmitting of paging messages, scheduling and transmitting of broadcast channel (BCH) information, dynamic allocation of resources to UEs 10 in both uplink and downlink, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

FIG. 3 shows a user-plane protocol and a control-plane protocol stack for the E-UMTS.

FIG. 3(a) is block diagram depicting the user-plane protocol, and FIG. 3(b) is block diagram depicting the control-plane protocol. As illustrated, the protocol layers may be divided into a first layer (L1), a second layer (L2) and a third layer (L3) based upon the three lower layers of an open system interconnection (OSI) standard model that is well known in the art of communication systems.

The physical layer, the L1, provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of the L2 provides services to a radio link control (RLC) layer (which is a higher layer) via a logical channel. The RLC layer of the L2 supports the transmission of data with reliability. It should be noted that the RLC layer illustrated in FIGS. 3(a) and 3(b) is depicted because if the RLC functions are implemented in and performed by the MAC layer, the RLC layer itself is not required. A packet data convergence protocol (PDCP) layer of the L2 performs a header compression function that reduces unnecessary control information such that data being transmitted by employing IP packets, such as IPv4 or IPv6, can be efficiently sent over a radio (wireless) interface that has a relatively small bandwidth.

A radio resource control (RRC) layer located at the lowest portion of the L3 is only defined in the control plane and controls logical channels, transport channels and the physical channels in relation to the configuration, reconfiguration, and release of the radio bearers (RBs). Here, the RB signifies a service provided by the L2 for data transmission between the terminal and the UTRAN.

As illustrated in FIG. 3(a), the RLC and MAC layers (terminated in an eNB 20 on the network side) may perform functions such as scheduling, automatic repeat request (ARQ), and hybrid automatic repeat request (HARM). The PDCP layer (terminated in eNB 20 on the network side) may perform the user plane functions such as header compression, integrity protection, and ciphering.

As illustrated in FIG. 3(b), the RLC and MAC layers (terminated in an eNodeB 20 on the network side) perform the same functions for the control plane. As illustrated, the RRC layer (terminated in an eNB 20 on the network side) may perform functions such as broadcasting, paging, RRC connection management, RB control, mobility functions, and UE measurement reporting and controlling. The NAS control protocol (terminated in the MME of gateway 30 on the network side) may perform functions such as a SAE bearer management, authentication, LTE_IDLE mobility handling, paging origination in LTE_IDLE, and security control for the signaling between the gateway and UE 10.

The RRC state may be divided into two different states such as a RRC_IDLE and a RRC_CONNECTED. In RRC_IDLE state, the UE 10 may receive broadcasts of system information and paging information while the UE specifies a discontinuous reception (DRX) configured by NAS, and the UE has been allocated an identification (ID) which uniquely identifies the UE in a tracking area and may perform PLMN selection and cell re-selection. Also, in RRC_IDLE state, no RRC context is stored in the eNB.

In RRC_CONNECTED state, the UE 10 has an E-UTRAN RRC connection and a context in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE state, the UE 10 specifies the paging DRX cycle. Specifically, the UE monitors a paging signal at a specific paging occasion of every UE specific paging DRX cycle.

The paging occasion is a time interval during which a paging signal is transmitted. The UE 10 has its own paging occasion.

A paging message is transmitted over all cells belonging to the same tracking area. If the UE 10 moves from one tracking area to another tracking area, the UE will send a tracking area update message to the network to update its location.

FIG. 4 shows an example of structure of a physical channel.

The physical channel transfers signaling and data between layer L1 of a UE and eNB. As illustrated in FIG. 4, the physical channel transfers the signaling and data with a radio resource, which consists of one or more sub-carriers in frequency and one more symbols in time.

One sub-frame, which is 1 ms in length, consists of several symbols. The particular symbol(s) of the sub-frame, such as the first symbol of the sub-frame, can be used for downlink control channel (PDCCH). PDCCHs carry dynamic allocated resources, such as PRBs and modulation and coding scheme (MCS).

A transport channel transfers signaling and data between the L1 and MAC layers. A physical channel is mapped to a transport channel.

Downlink transport channel types include a broadcast channel (BCH), a downlink shared channel (DL-SCH), a paging channel (PCH) and a multicast channel (MCH). The BCH is used for transmitting system information. The DL-SCH supports HARQ, dynamic link adaptation by varying the modulation, coding and transmit power, and both dynamic and semi-static resource allocation. The DL-SCH also may enable broadcast in the entire cell and the use of beamforming. The PCH is used for paging a UE. The MCH is used for multicast or broadcast service transmission.

Uplink transport channel types include an uplink shared channel (UL-SCH) and random access channel(s) (RACH). The UL-SCH supports HARQ and dynamic link adaptation by varying the transmit power and potentially modulation and coding. The UL-SCH also may enable the use of beamforming. The RACH is normally used for initial access to a cell.

The MAC sublayer provides data transfer services on logical channels. A set of logical channel types is defined for different data transfer services offered by MAC. Each logical channel type is defined according to the type of information transferred.

Logical channels are generally classified into two groups. The two groups are control channels for the transfer of control plane information and traffic channels for the transfer of user plane information.

Control channels are used for transfer of control plane information only. The control channels provided by MAC include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by MAC include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include a DCCH that can be mapped to UL-SCH, a DTCH that can be mapped to UL-SCH and a CCCH that can be mapped to UL-SCH. Downlink connections between logical channels and transport channels include a BCCH that can be mapped to BCH or DL-SCH, a PCCH that can be mapped to PCH, a DCCH that can be mapped to DL-SCH, and a DTCH that can be mapped to DL-SCH, a MCCH that can be mapped to MCH, and a MTCH that can be mapped to MCH.

3GPP LTE-A may supports relaying by having a relay node (RN) wirelessly connect to an eNB serving the RN. It may be referred to paragraph 4.7 of 3rd generation partnership project (3GPP) TS 36.300 V10.2.0 (2010-12).

FIG. 5 shows an objective of relay.

Referring to FIG. 5, a relay node (RN) wirelessly communicates with an eNB supporting relay, and thus can support capacity assistance of a shadow region or coverage extension through a service for UEs located in a cell boundary region and outside the boundary region. The eNB serving the RN may be referred as a donor eNB (DeNB). The DeNB requires several additional functions for supporting relay. When there is an access of the relay node, the DeNB can perform a reconfiguration task to provide information required for relay and system information through dedicated signaling. The DeNB and the RN may be connected via a modified version of the E-UTRA radio interface. The modified version may be referred as a Un interface.

The RN may support eNB functionality. It means that the RN terminates the radio protocols of the E-UTRA radio interface, and S1 and X2 interfaces. In addition to the eNB functionality, the RN may also support a subset of UE functionality, e.g., a physical layer, layer-2, RRC, and NAS functionality, in order to wirelessly connect to the DeNB. That is, the relay node can operate as a relay-type UE with respect to the DeNB, and can operate as an eNB with respect to a served UE.

FIG. 6 shows an overall E-UTRAN architecture supporting relay nodes.

Referring to FIG. 6, the LTE-A network includes an E-UTRAN, an EPC and one or more user equipment (not described). The E-UTRAN may include one or more relay node (RN) 50, one or more DeNB 60, one or more eNB 61 and a plurality of UE may be located in one cell. One or more E-UTRAN MME/S-GW 70 may be positioned at the end of the network and connected to an external network.

As used herein, "downlink" refers to communication from the eNB 61 to the UE, from the DeNB 60 to the UE or from the RN 50 to the UE, and "uplink" refers to communication from the UE to the eNB 61, from the UE to the DeNB 60 or from the UE to the RN 50. The UE refers to communication equipment carried by a user and may be also referred to as a mobile station (MS), a user terminal (UT), a subscriber station (SS) or a wireless device.

The eNB 61 and the DeNB 60 provide end points of a user plane and a control plane to the UE. The MME/S-GW 70 provides an end point of a session and mobility management function for UE. The eNB 61 and the MME/S-GW 70 may be connected via an S1 interface. The DeNB 60 and MME/SAE gateway 70 may be connected via an S1 interface. The eNBs 61 may be connected to each other via an X2 interface and neighboring eNBs may have a meshed network structure that has the X2 interface. The eNB 61 and the DeNB 60 may be connected to each other via an X2 interface.

The RN 50 may be wirelessly connected to the DeNB 60 via a modified version of the E-UTRA radio interface being called the Un interface. That is, the RN 50 may be served by the DeNB 60. The RN 50 may support the eNB functionality which means that it terminates the S1 and X2 interfaces. Functionality defined for the eNB 61 or the DeNB 60, e.g. radio network layer (RNL) and transport network layer (TNL), may also apply to RNs 50. In addition to the eNB functionality, the RN 50 may also support a subset of the UE functionality, e.g. physical layer, layer-2, RRC, and NAS functionality, in order to wirelessly connect to the DeNB 60.

The RN 50 may terminate the S1, X2 and Un interfaces. The DeNB 60 may provide S1 and X2 proxy functionality between the RN 50 and other network nodes (other eNBs, MMEs and S-GWs). The S1 and X2 proxy functionality may include passing UE-dedicated S1 and X2 signaling messages as well as GTP data packets between the S1 and X2 interfaces associated with the RN 50 and the S1 and X2 interfaces associated with other network nodes. Due to the proxy functionality, the DeNB 60 appears as an MME (for S1) and an eNB (for X2) to the RN 50.

The DeNB 60 may also embed and provides the S-GW/P-GW-like functions needed for the RN operation. This includes creating a session for the RN 50 and managing EPS bearers for the RN 50, as well as terminating the S11 interface towards the MME serving the RN 50.

The RN 50 and the DeNB 60 may also perform mapping of signaling and data packets onto EPS bearers that are setup for the RN. The mapping may be based on existing QoS mechanisms defined for the UE and the P-GW.

The relay node may be classified to a fixed relay node and a mobile relay node. The mobile relay node may be applied to the 3GPP LTE rel-11. One of the possible deployment scenarios of mobile relay node is high speed public transportation, e.g., a high speed railway. That is, the mobile relay node may be put on the top of a high speed train. Hence, it is easily expected that the provision of various good quality services towards the users on a high speed public transportation will be important. Meanwhile, the service requirements offered by the fixed relay node seem to be different from those offered by the mobile relay node. So, there might be a few of considerations that should be resolved in the mobile relay node. The solutions to resolve these considerations for mobile relay node may have impacts on a radio access network (RAN).

FIG. 7 shows an example of deployments scenario of mobile relay node at a high speed train.

Referring to FIG. 7, a mobile relay node is installed in a high speed train. A coverage of the mobile relay node may correspond to the entirety of the high speed train or each of cars constituting the high speed train. The mobile relay node can communicate with UEs in the high speed train through an access link. At present, the mobile relay node is in a coverage of an eNB1 supporting relay. The mobile relay node can communicate with the eNB1 through a backhaul link. When the high speed train moves, the mobile relay node may enter a coverage of an eNB2 supporting relay. Accordingly, the mobile relay node can be handed over from the eNB1 to the eNB2.

When the high speed train in which the mobile relay node is installed moves fast, the mobile relay node may enter a coverage of an eNB not supporting relay. In this case, the mobile relay node cannot operate, and a service interruption occurs with respect to a great number of UEs connected to the mobile relay node.

Accordingly, there is a need for a method of avoiding a service interruption of UEs connected to a mobile relay node.

SUMMARY OF INVENTION

Technical Problem

The present invention provides a method and apparatus for indicating a handover in a wireless communication system including a mobile relay node. The present invention provides a method for avoiding possible service interruption for user equipments (UEs) in a mobile relay environment.

Solution to Problem

In an aspect, a method for indicating a handover in a wireless communication system is provided. The method includes receiving, by a mobile relay node (RN), an indication which indicates that there is no eNB supporting relay within neighbor cells from a donor eNodeB (eNB) serving the mobile relay node, and transmitting, by a mobile relay node, a handover command message to user equipments (UEs).

In another aspect, a method for indicating a handover in a wireless communication system is provided. The method includes receiving, by a mobile relay node (RN), an indication which indicates whether a macro eNB supports relay from the macro eNB, detecting, by a mobile relay node, whether the macro eNB supports relay or not, and transmitting, by a mobile relay node, a handover command message to user equipments (UEs).

In another aspect, a mobile relay node in a wireless communication system is provided. The mobile relay node includes a radio frequency (RF) unit for transmitting or receiving a radio signal, and a processor, operatively coupled to the RF unit, and configured for receiving an indication which indicates that there is no eNB supporting relay within neighbor cells from a donor eNodeB (eNB) serving the mobile relay node, and transmitting a handover command message to user equipments (UEs).

Advantageous Effects of Invention

A service interruption for UEs in a mobile relay environment can be avoided.

BRIEF DESCRIPTION OF DRAWINGS

FIG. 3 shows a user-plane protocol and a control-plane protocol stack for the E-UMTS.

MODE FOR THE INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Here, an attach procedure for a relay node (RN), a startup procedure for the RN and a detach procedure for the RN are described below.

Figure 1:
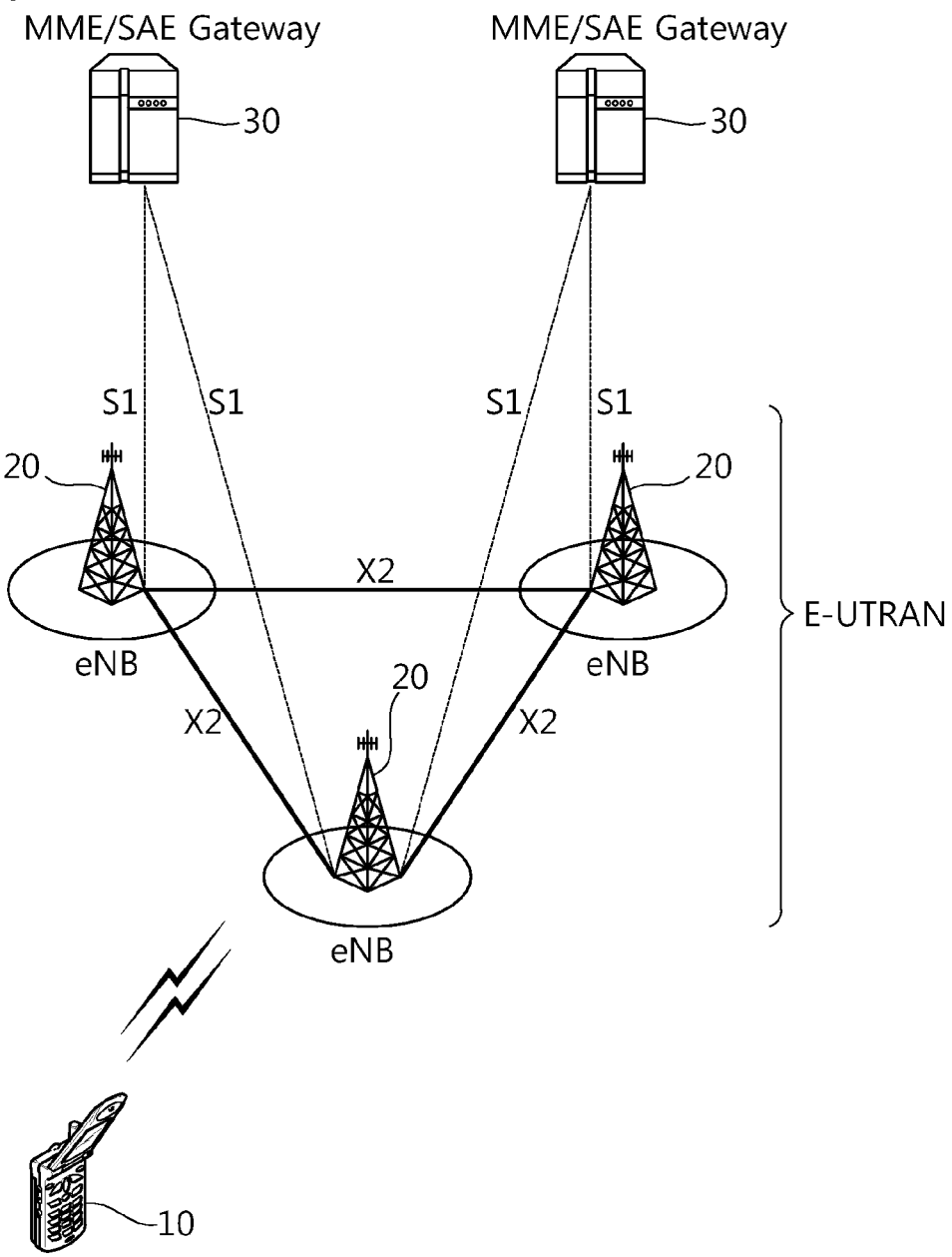
FIG. 1 shows network structure of an evolved universal mobile telecommunication system (E-UMTS).
Figure 2:
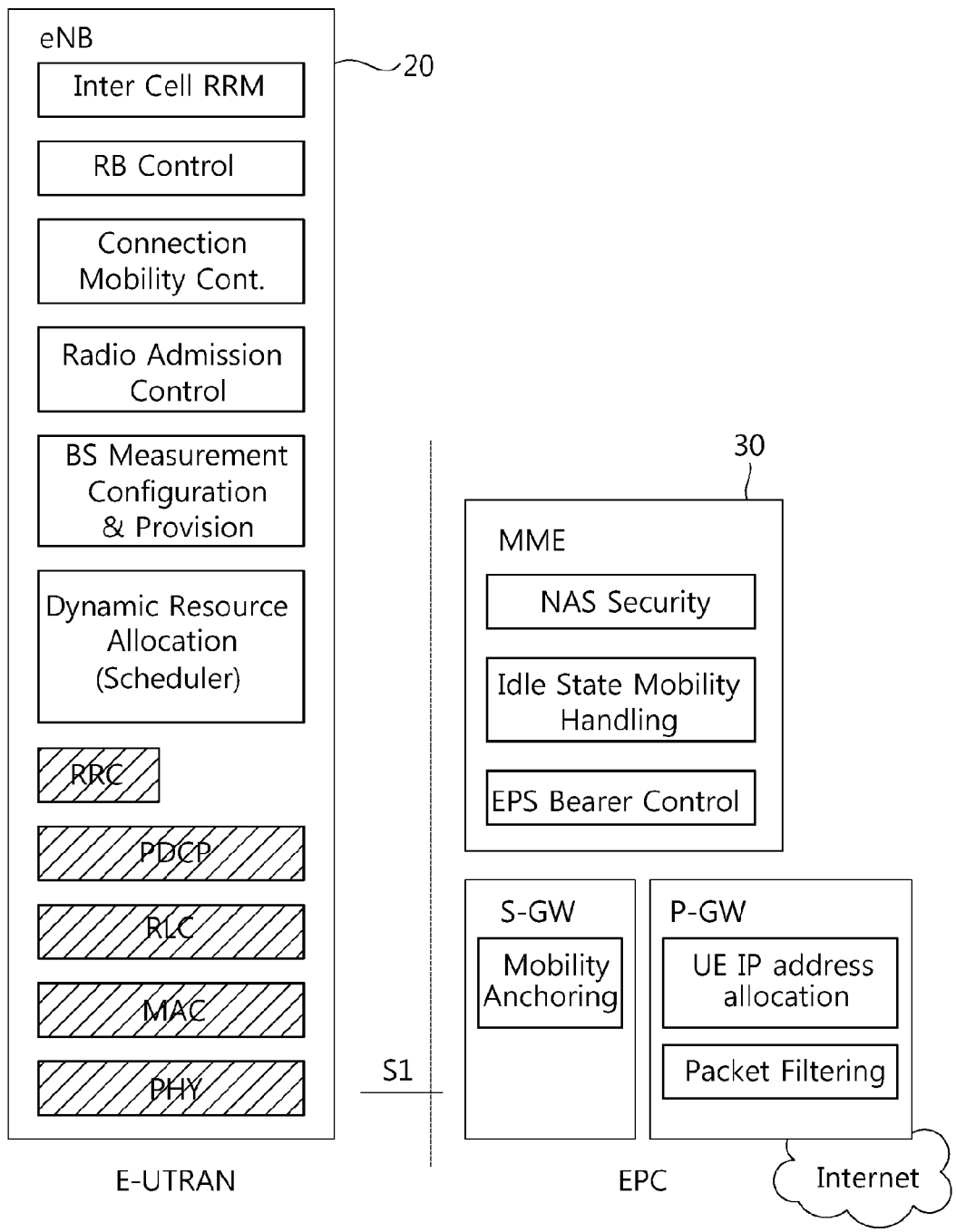
FIG. 2 shows architecture of a typical E-UTRAN and a typical EPC.
Figure 4:
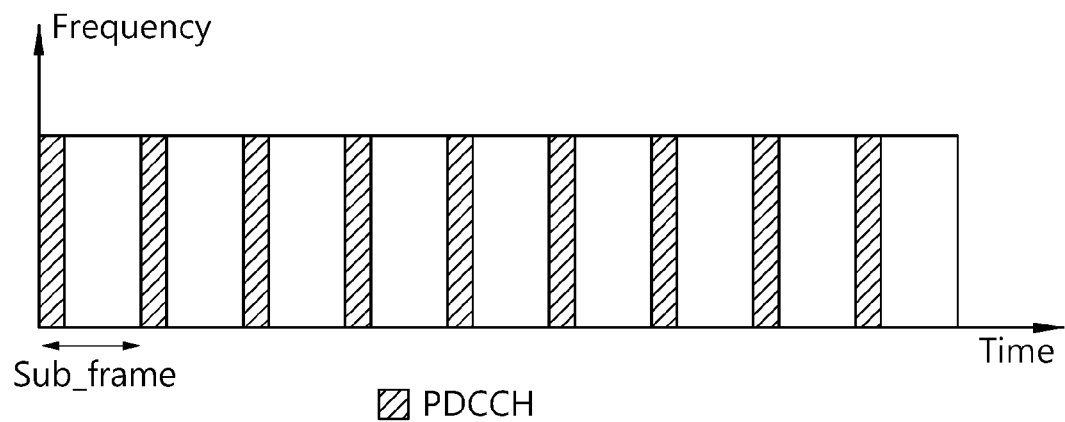
FIG. 4 shows an example of structure of a physical channel.
Figure 5:
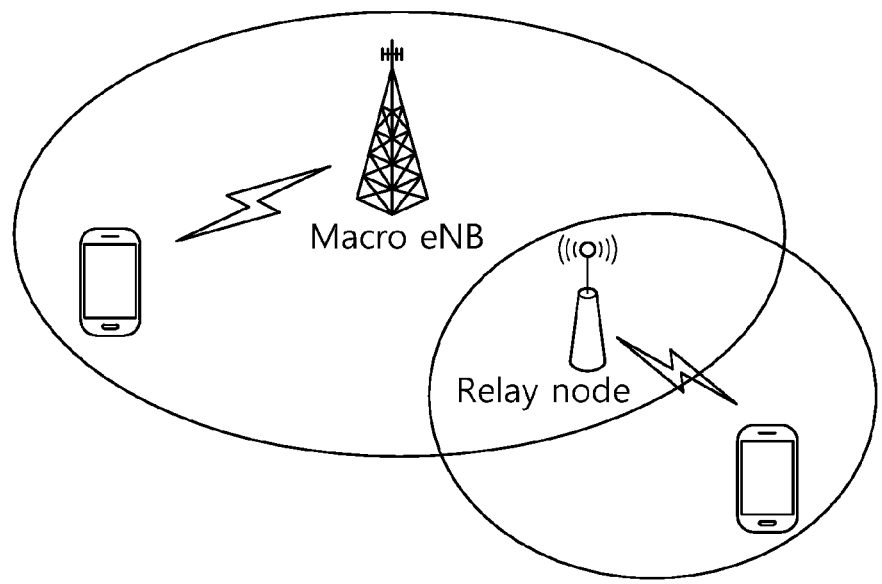
FIG. 5 shows an objective of relay.
Figure 6:
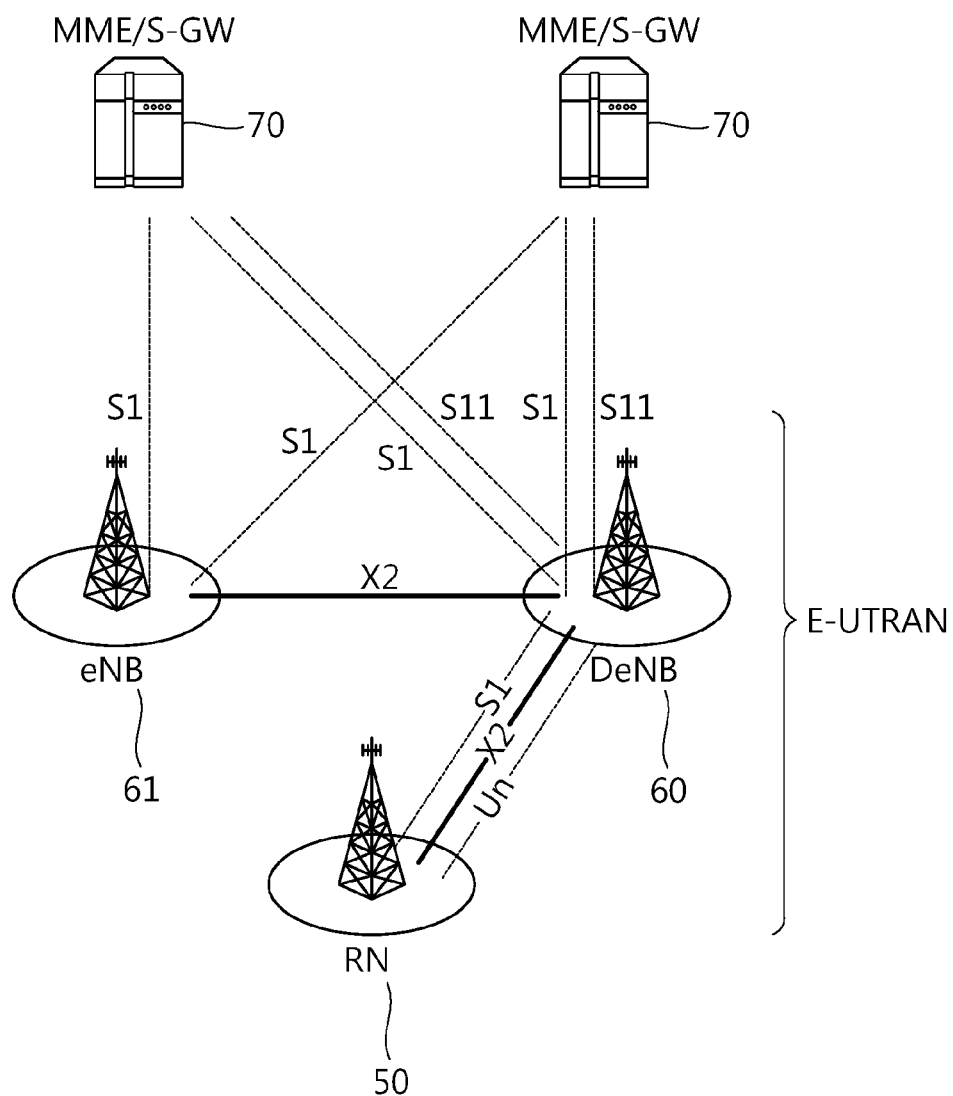
FIG. 6 shows an overall E-UTRAN architecture supporting relay nodes.
Figure 7:
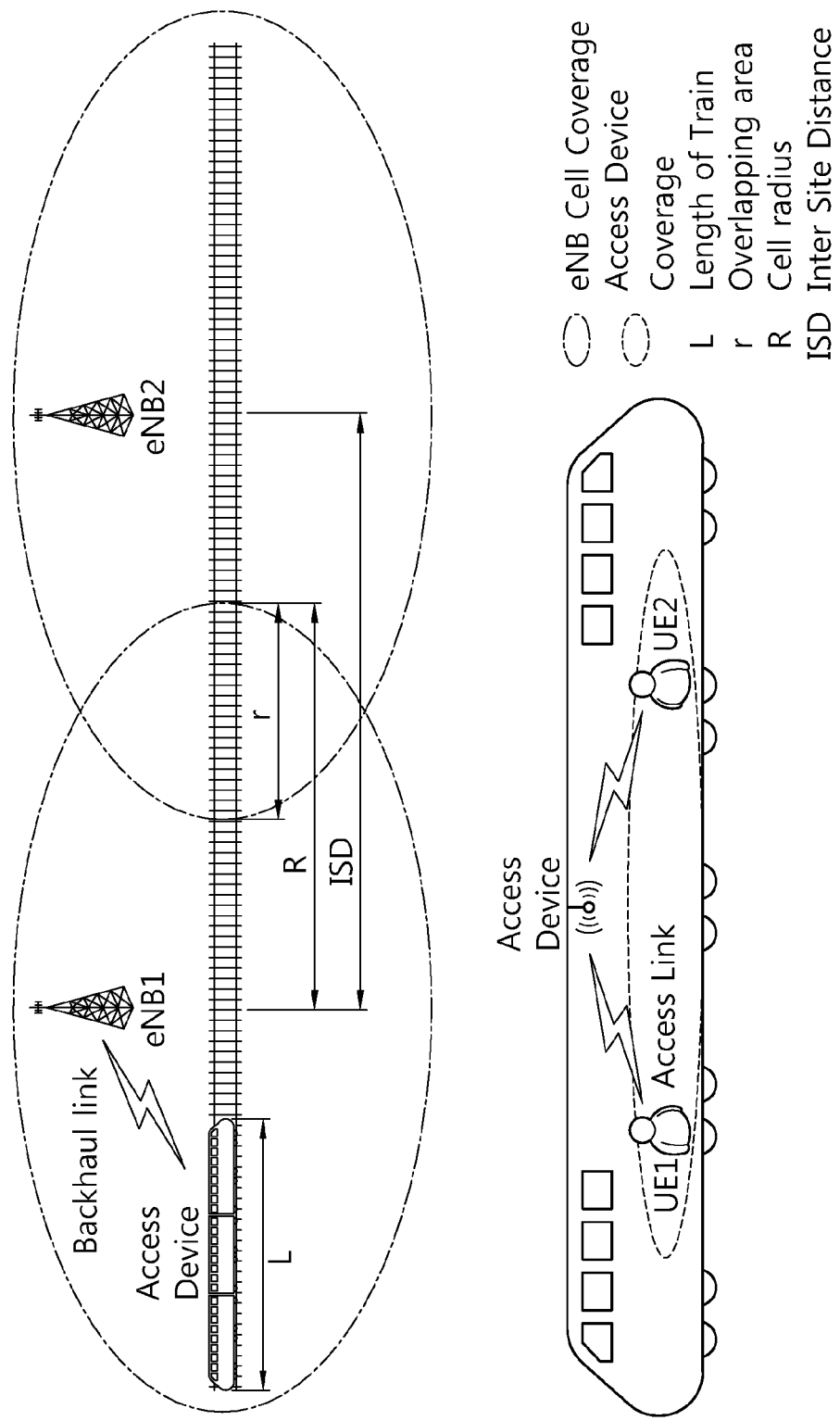
FIG. 7 shows an example of deployments scenario of mobile relay node at a high speed train.
Figure 8:
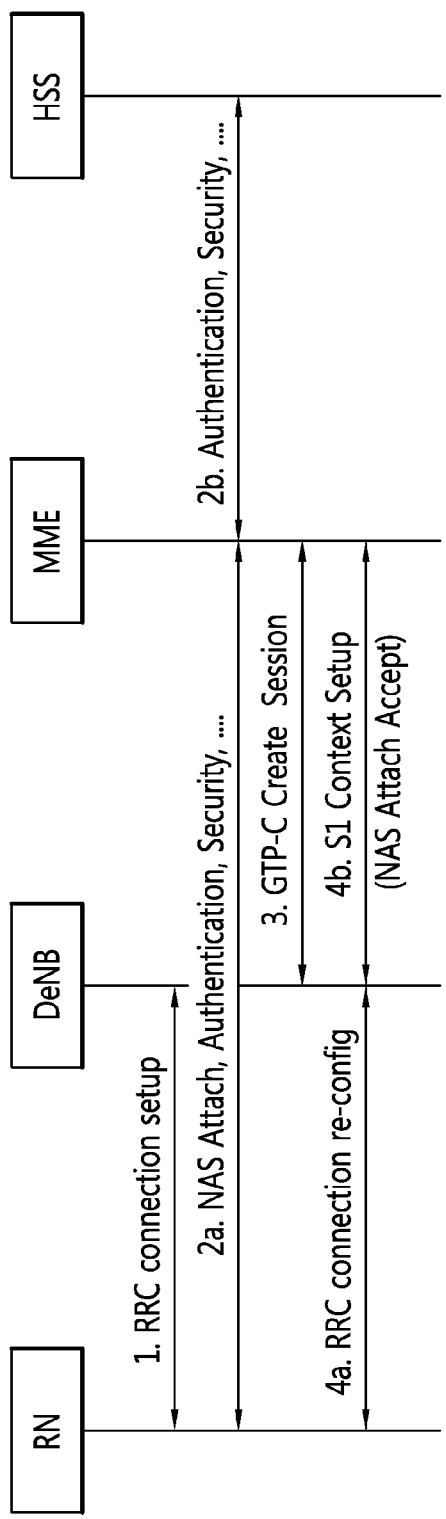
FIG. 8 shows a simplified version of the attach procedure for a relay node.

FIG. 8 shows a simplified version of the attach procedure for a relay node. This procedure is similar to a normal user equipment (UE) attach procedure.

The DeNB may be aware of which MMEs support RN functionality via an S1 setup response message earlier received from the MMEs. The RN may transmit an RN indication to the DeNB during RRC connection establishment. After receiving the RN indication from the RN, the DeNB may transmit the RN indication and an interne protocol (IP) address of the SGW/P-GW function embedded in the DeNB, within an initial UE message, to the MME supporting RN functionality. The MME may select S-GW/P-GW for the RN based on the IP address included in the initial UE message. During the attach procedure, the EPC checks if the RN is authorized for relay operation. Only if the RN is authorized, the EPC accepts the attach procedure and sets up a context with the DeNB. Otherwise the EPC rejects the attach procedure. The RN may be preconfigured with information about which cells (DeNBs) it is allowed to access.

Figure 9:
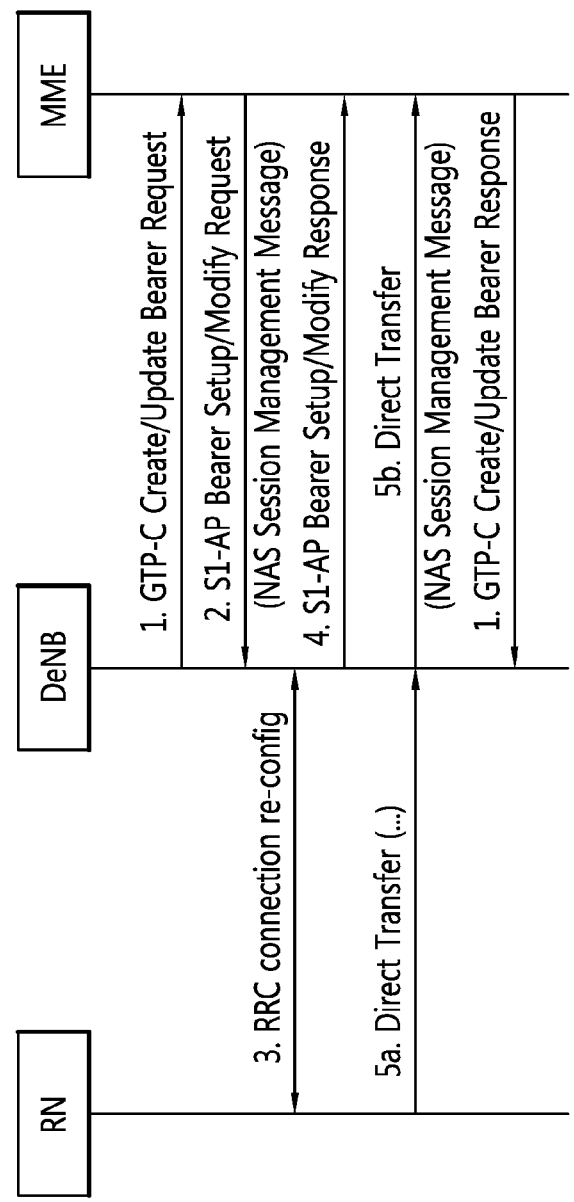
FIG. 9 shows a simplified version of the DeNB-initiated bearer activation/modification procedure.

FIG. 9 shows a simplified version of the DeNB-initiated bearer activation/modification procedure. This procedure may be used by the DeNB to change the EPS bearer allocation for the RN.

Figure 10:
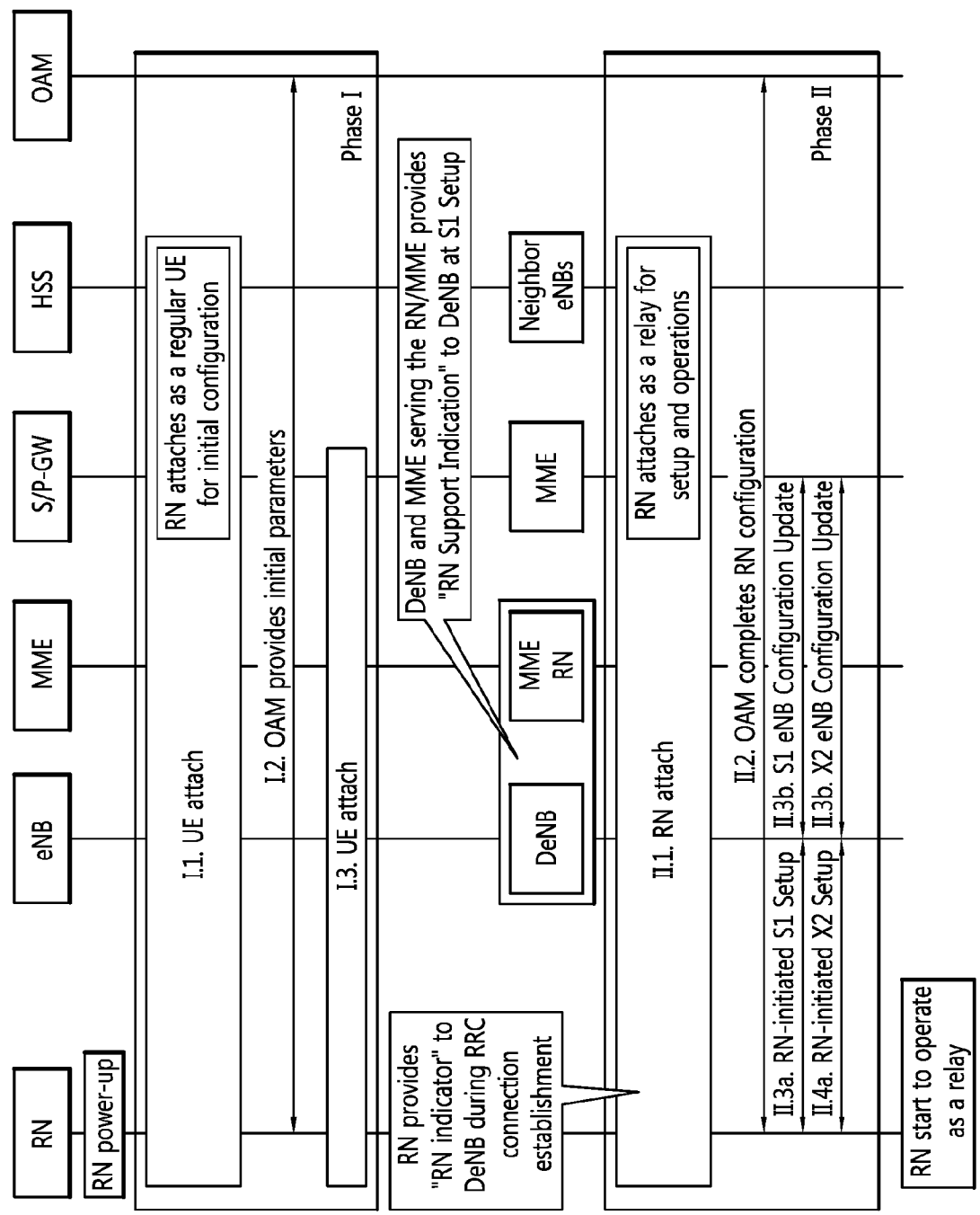
FIG. 10 shows a simplified version of the startup procedure for an relay node.

FIG. 10 shows a simplified version of the startup procedure for an relay node. This procedure is based on a normal UE attach procedure and it consists of the following two phases. This procedure may be defined for a fixed relay node or a mobile relay node.

1) Phase I: Attach for RN preconfiguration.

The RN attaches to an E-UTRAN/EPC as a UE at power-up and retrieves initial configuration parameters, including a list of DeNB cells, from an RN OAM. After this operation is complete, the RN detaches from the network as a UE and triggers a phase II. The MME performs the S-GW and P-GW selection for the RN as a normal UE.

2) Phase II: Attach for RN operation.

The RN attaches as a relay for setup and operations. The RN connects to a DeNB selected from the list acquired during the phase I to start relay operations. In this case, the RN may provide an RN indicator to the DeNB during an RRC connection establishment. Also, the MME provides an RN support indication to the DeNB at S1 setup. After the DeNB initiates setup of bearer for S1/X2, the RN initiates a setup of S1 and X2 associations with the DeNB. In addition, the DeNB may initiate an RN reconfiguration procedure via RRC signaling for RN-specific parameters.

After the S1 setup, the DeNB performs an S1 eNB configuration update procedure, if configuration data for the DeNB is updated due to the RN attach. After the X2 setup, the DeNB performs the X2 eNB configuration update procedure to update the cell information.

In this phase the RN cells' evolved cell global identifiers (ECGIs) are configured the RN OAM.

Figure 11:
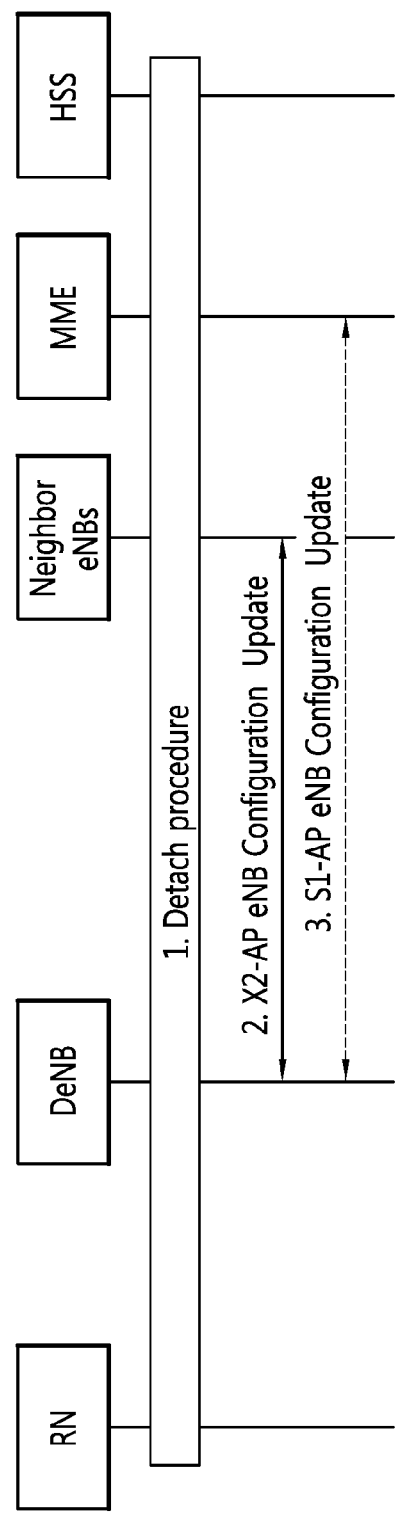
FIG. 11 shows a simplified version of the detach procedure for a relay node operation in case no UE is connected to the relay node.

FIG. 11 shows a simplified version of the detach procedure for a relay node operation in case no UE is connected to the relay node. The detach procedure is the same as a normal UE detach procedure. The DeNB performs the X2 eNB configuration update procedure to update the cell information. The DeNB performs the S1 eNB configuration update procedure, if configuration data for the DeNB is updated due to the RN detach.

The X2 eNB configuration update procedure described above may be used by the DeNB to also transfer application level configuration data of a single neighboring eNB to the RN. Upon reception of an eNB configuration update message, if the served cells contained in the eNB configuration update message belong to the neighbor eNB rather than the DeNB, the RN shall regard the X2 interface between the DeNB and the neighbor eNB as available. The RN will update an X2 availability, the corresponding GU group ID and other information of the neighbor eNB according to the eNB configuration update message.

Meanwhile, in case of a handover procedure between the RN and the neighbor eNB, the following may be applied.

The DeNB may inform the RN of any globally unique mobility management entity identifier (GUMMEI) of the UE's serving MME in an initial context setup request message and an S1 handover request messages. Considering this information as well as the GU group ID of the neighbor eNB and the X2 interface availability between DeNB and neighbor eNB, the RN initiates either S1 or X2 handover for the UE. In case the GUMMEI information is not available to the RN, the RN may attempt X2 handover for the UE. Upon X2 handover failure, S1 handover may be initiated.

The S1/X2 handover request message is received by the DeNB, which reads a target cell ID from the S1/X2 handover request message, finds a target node corresponding to the target cell ID, and forwards the S1/X2 handover request message toward the target node if appropriate.

When a mobile relay node moves, the mobile relay node may not have all of available DeNB lists in a path along which the mobile relay node moves. In case of a fixed relay node, an available DeNB list can be known through initial preconfiguration, and there is significantly little possibility of change once it is installed. On the other hand, in case of the mobile relay node, it may not have all available DeNB lists since the mobile relay node moves. In particular, if the mobile relay node is installed in another transportation means requiring more flexibility in its route than that of the high speed train, there is a higher possibility that the mobile relay node does not have all DeNB lists.

Figure 12A:
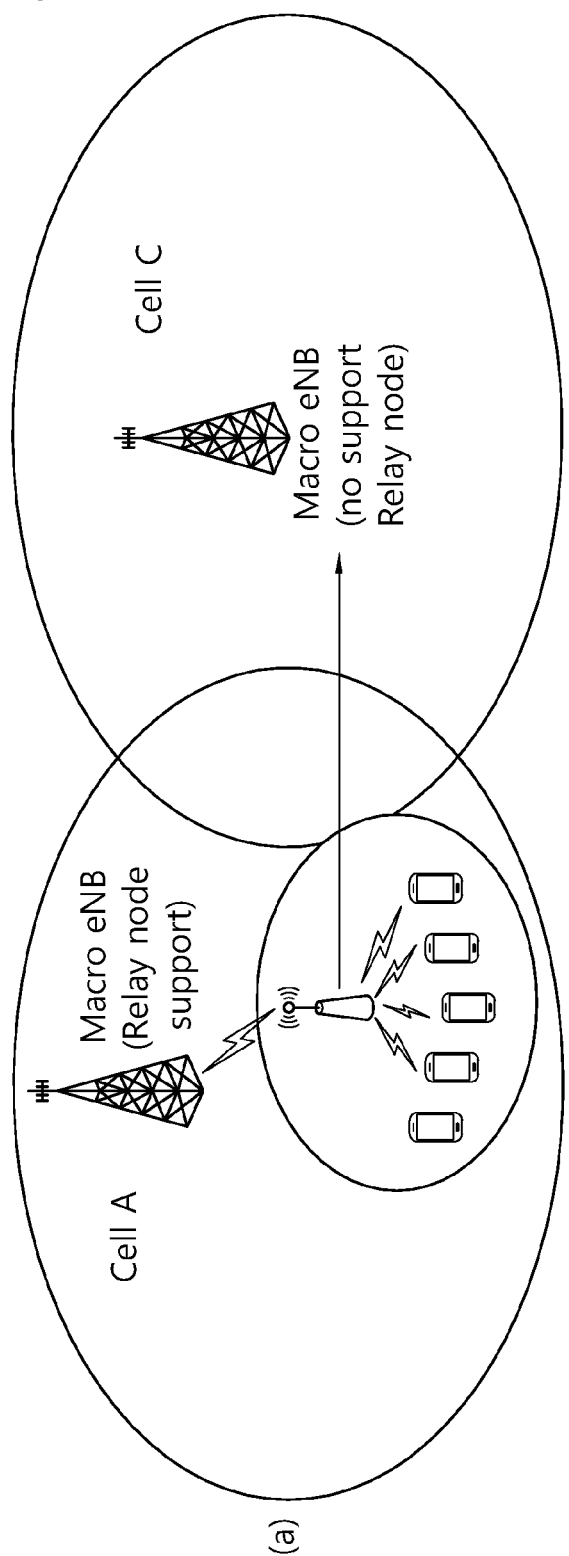
FIG. 12 shows a case in which a service interruption occurs for UEs connected to a mobile relay node when a mobile relay moves.
Figure 12B:
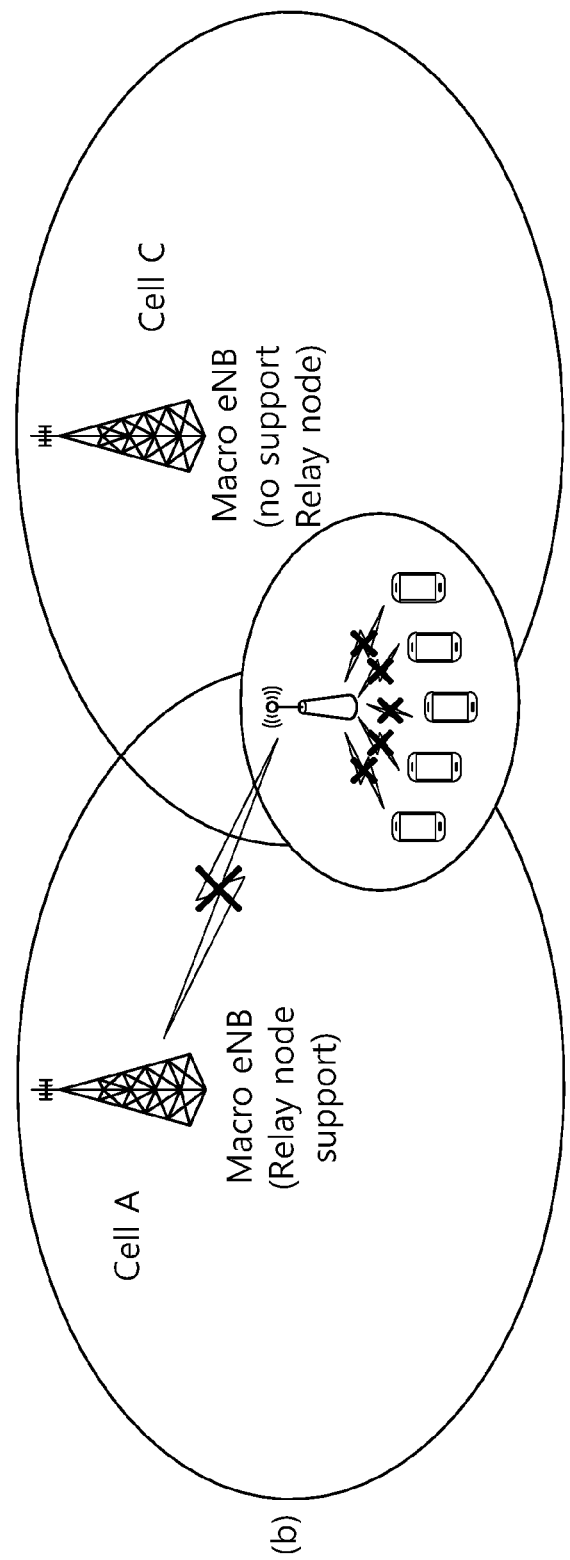

FIG. 12 shows a case in which a service interruption occurs for UEs connected to a mobile relay node when a mobile relay moves.

Referring to FIG. 12-(a), a mobile relay node is located in a coverage of a cell A, and a plurality of UEs are served by the mobile relay node. An eNB serving the cell A is a DeNB supporting relay. In FIG. 12-(b), a mobile relay node moves from a cell A to a cell C. An eNB serving the cell C is a normal eNB not supporting relay. In this case, if the mobile relay node moves to the cell C without taking any action, the mobile relay node cannot be served by the eNB serving the cell C. Therefore, a plurality of UEs having a good link with the mobile relay node cannot be served either, which may cause a serious service interruption. Therefore, a method for solving this problem can be proposed.

1) An embodiment of the present invention proposes a method in which a DeNB minimizes a service interruption of UEs served by a mobile relay node which camps on the DeNB. That is, in a situation where cell power of a serving cell deteriorates when the mobile relay node moves, the DeNB analyzes neighbor cell information of the mobile relay node on the move. If the analysis result of the neighbor cell information shows that the DeNB predicts or detects that there is no neighbor macro cell supporting relay, the DeNB can report this to the mobile relay node. Accordingly, the UEs served by the mobile relay node can prevent a predicted service interruption by performing a handover to a neighbor macro eNB as soon as possible.

Hereinafter, the proposed handover indication method will be described according to an embodiment of the present invention.

When a DeNB recognizes that there is no neighbor eNBs supporting relay, the DeNB can report this to a mobile relay node. The mobile relay node can receive such indication from the DeNB, and if link quality with respect to a currently served DeNB deteriorates, can indicate a handover of UEs served by the mobile relay node to a macro cell. Accordingly, a service interruption of the UEs can be minimized.

Figure 13:
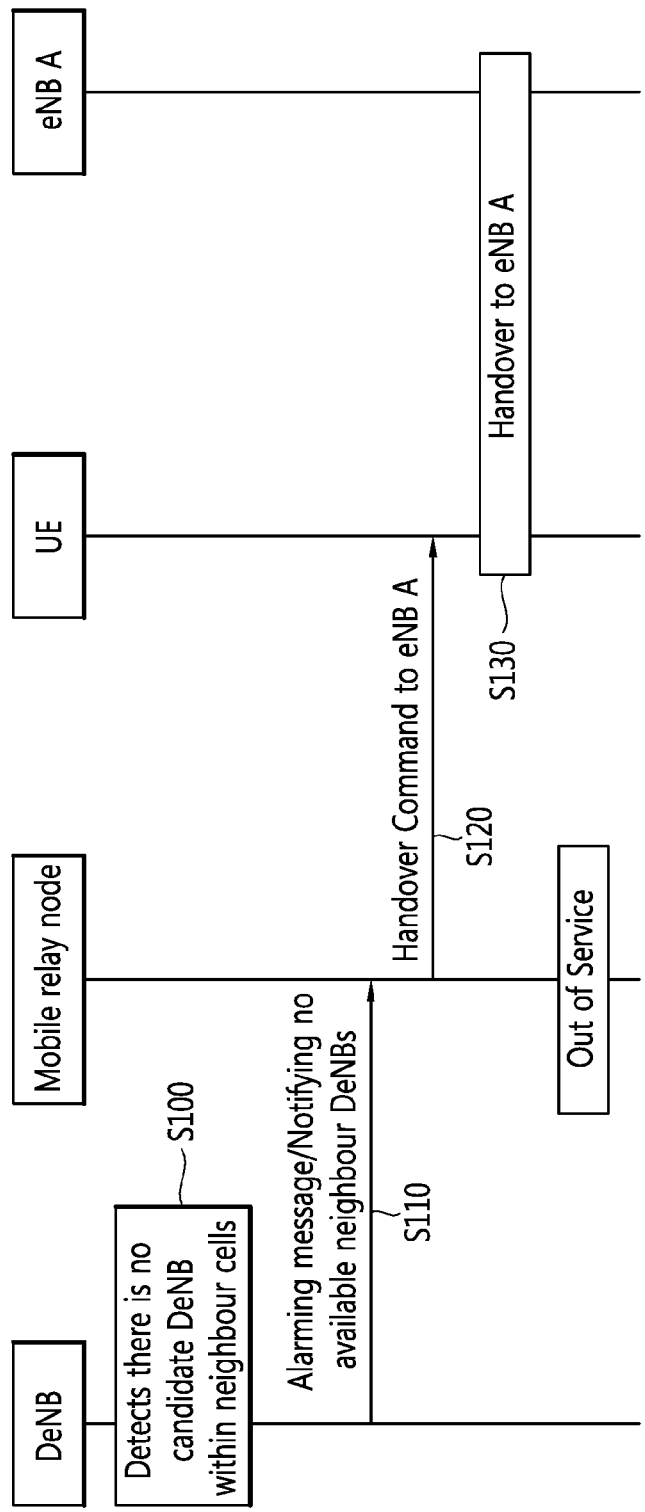
FIG. 13 shows an example of a handover indication method according to an embodiment of the present invention.

FIG. 13 shows an example of a handover indication method according to an embodiment of the present invention.

Referring to FIG. 13, in step S100, a DeNB serving a mobile relay node recognizes that there is no DeNB supporting relay within neighbor cells. In step S110, the DeNB reports to the mobile relay node that there is no neighbor DeNB supporting relay. In step S120, the mobile relay node transmits a handover command message to UEs. In step S130, the UEs perform a handover to an eNB A according to the handover command message. Thereafter, a service is interrupted in the mobile relay node. However, since the UEs are handed over to the eNB A, a service interruption of the UEs can be avoided.

Figure 14:
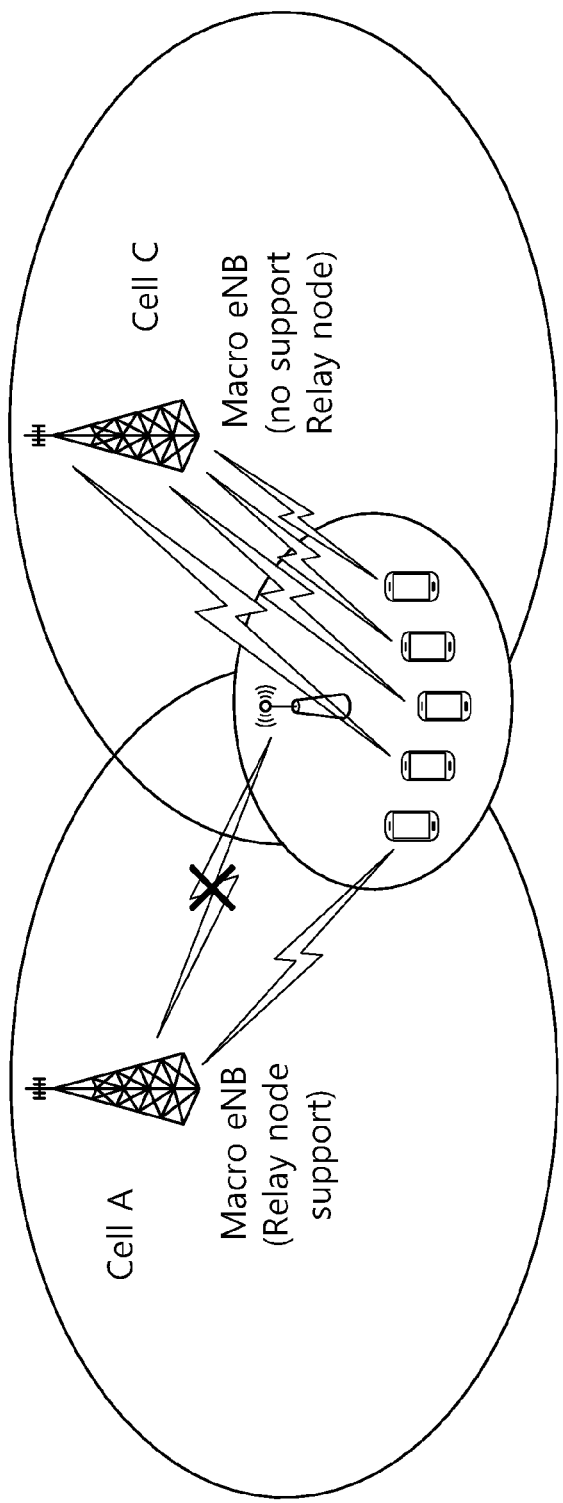
FIG. 14 shows a case in which UEs are handed over to a macro cell by using a handover indication method according to an embodiment of the present invention.

FIG. 14 shows a case in which UEs are handed over to a macro cell by using a handover indication method according to an embodiment of the present invention. Referring to FIG. 14, since a macro eNB serving a cell C does not support relay, a service is interrupted in a mobile relay node. However, according to the embodiment of the present invention, a DeNB serving a cell A can report this to the mobile relay node, and the mobile relay node instructs UEs to handover to a macro eNB serving a cell C. Accordingly, UEs served by the mobile relay node can communicate with a proper neighbor macro eNB without experiencing a service interruption.

2) A current DeNB reports capability supporting relay by using system information. By using such information, a mobile relay node can know whether a neighbor cell can be served as a DeNB when monitoring neighbor cells. In this case, even if the DeNB on which the mobile relay node currently camps does not transmit a specific message to the mobile relay node as described in the case 1), the mobile relay node can autonomously determine to instruct UEs served by the mobile relay node to handover to a neighbor macro cell.

Figure 15:
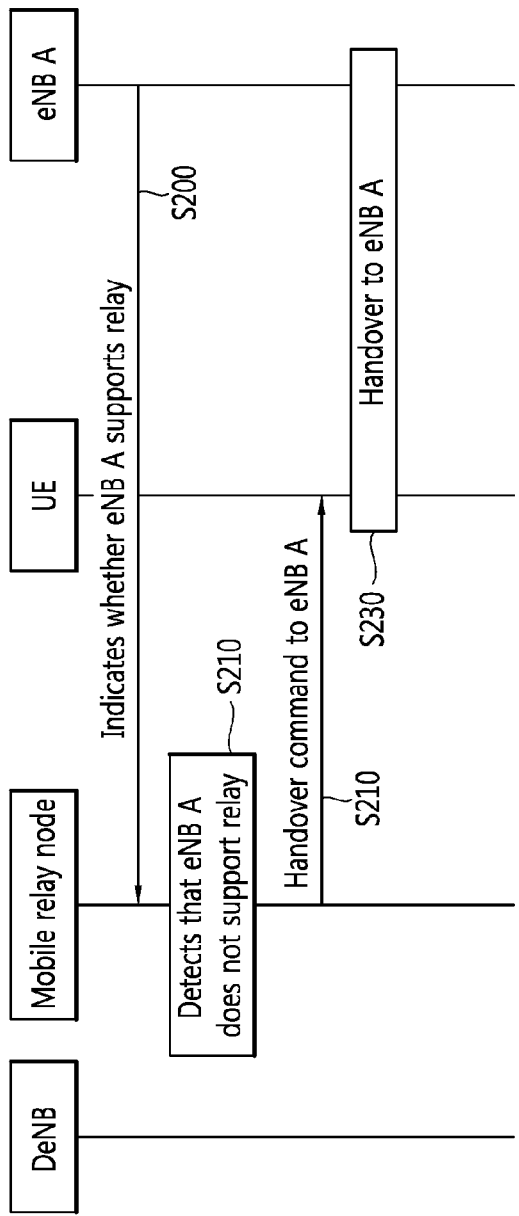
FIG. 15 shows another example of a handover indication method according to an embodiment of the present invention.

FIG. 15 shows another example of a handover indication method according to an embodiment of the present invention.

Referring to FIG. 15, in step S200, an eNB A transmits whether the eNB A can support relay. This can be transmitted by using system information. In step S210, a mobile relay node recognizes that the eNB A is an eNB not supporting relay. In step S220, the mobile relay node transmits a handover command message to UEs. In step S230, the UEs perform a handover to the eNB A according to the handover command message. Thereafter, a service is interrupted in the mobile relay node. However, since the UEs are handed over to the eNB A, a service interruption of the UEs can be avoided.

3) The mobile relay node can update a DeNB list by using an initial attachment process, a tracking area update (TAU) process, or a reconfiguration process. In a case where the mobile relay node must perform a handover, if there is no cell included in the DeNB list of the mobile relay node within neighbor cells, the mobile relay node may determine that there is no available DeNBs. Therefore, the mobile relay node instructs UEs served by the mobile relay node to handover to a neighbor macro cell. In this case, however, there is a disadvantage in that a relay-based service may be interrupted if the DeNB supporting relay is contained in neighbor cells but it is not included in the DeNB list of the mobile relay node.

Figure 16:
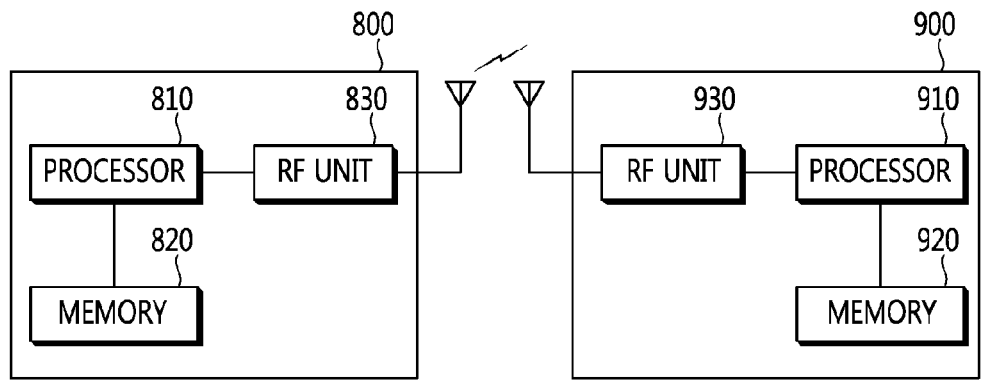
FIG. 16 is a block diagram showing wireless communication system to implement an embodiment of the present invention.

FIG. 16 is a block diagram showing wireless communication system to implement an embodiment of the present invention.

A mobile relay node eNB 800 includes a processor 810, a memory 820, and an RF (radio frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

An eNB 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for indicating a handover in a wireless communication system, the method comprising:
  receiving, by a mobile relay node (RN) which is moving, an indication which indicates that there is no eNB supporting a relay within neighbor cells, from a donor eNodeB (DeNB) serving the mobile relay node;
  transmitting, by the mobile relay node, a handover command message to user equipments (UEs),
  wherein the handover command message instructs the UEs to perform a handover procedure to a macro eNB not serving the mobile relay node; and
  terminating a service for the UEs through the mobile relay node after the UEs perform the handover procedure to the macro eNB.

2. The method of claim 1, further comprising:
detecting, by the DeNB, that there is no eNB supporting the relay within the neighbor cells.

3. A mobile relay node in a wireless communication system, the mobile relay node comprising:
- a radio frequency (RF) unit configured to transmit or receive a radio signal; and
- a processor, operatively coupled to the RF unit, and configured to:
- receive an indication which indicates that there is no eNB supporting a relay within neighbor cells from a donor eNodeB (DeNB) serving the mobile relay node which is moving,
- transmit a handover command message to user equipments (UEs),
- wherein the handover command message instructs the UE to perform a handover procedure to a macro eNB not serving the mobile relay node, and
- terminate a service for the UEs through the mobile relay node after the UEs perform the handover procedure to the macro eNB.

* * * * *